United States Patent [19]
Slivka et al.

[11] Patent Number: 6,061,695
[45] Date of Patent: May 9, 2000

[54] OPERATING SYSTEM SHELL HAVING A WINDOWING GRAPHICAL USER INTERFACE WITH A DESKTOP DISPLAYED AS A HYPERTEXT MULTIMEDIA DOCUMENT

[75] Inventors: Benjamin W. Slivka, Clyde Hill; Teresa Anne Martineau, Kirkland; Christopher Ralph Brown, Seattle; George Pitt, Redmond; Satoshi Nakajima, Redmond; Sankar Ramasubtamanian, Redmond; Mike Sheldon, Redmond, all of Wash.

[73] Assignee: Microsoft Corporation, Redmond, Wash.

[21] Appl. No.: 08/761,699

[22] Filed: Dec. 6, 1996

[51] Int. Cl.⁷ ...................................... G06F 17/21
[52] U.S. Cl. ..................... 707/513; 345/333; 345/115; 707/501
[58] Field of Search ................. 345/326, 333, 345/315, 349; 395/200.57; 707/501, 513

[56] References Cited

U.S. PATENT DOCUMENTS

| | | |
|---|---|---|
| 4,575,579 | 3/1986 | Simon et al. . |
| 5,305,195 | 4/1994 | Murphy . |
| 5,347,632 | 9/1994 | Filepp et al. . |
| 5,491,820 | 2/1996 | Belove et al. . |
| 5,572,643 | 11/1996 | Judson . |
| 5,831,606 | 11/1998 | Nakajima et al. ............... 345/326 |
| 5,877,765 | 3/1999 | Dickman et al. ................ 345/349 |
| 5,905,492 | 5/1999 | Straub et al. .................... 345/333 |

FOREIGN PATENT DOCUMENTS

0749081A1  5/1996  European Pat. Off. .
WO 96/30864  10/1996  WIPO .

OTHER PUBLICATIONS

Gavron, Jacquelyn and Joseph Moran. "How to Use Microsoft (R) Windows (R) NT 4 Workstation." (Emeryville: Ziff Davis Press, 1996) pp. 24, 25, 28, 29, 88, 89, 100–105, 108, 109, 154–157 & 167, Jan. 1, 1996.
Tittle, Ed. and Steve James. "HTML for Dummies" 2d ed. (Foster City: IDG Books Worldwide, 1996) pp. 14, 15, 31–37, 57, 58, 60, 76–81, 131–133, 158, 350, 351, 385, 388, 392, 396 & 397, Mar. 11, 1996.

*Primary Examiner*—James P. Trammell
*Assistant Examiner*—John Leonard Young
*Attorney, Agent, or Firm*—Klarquist Sparkman Campbell Leigh & Whinston, LLP

[57] ABSTRACT

An operating system shell provides a graphical user interface having a windowing environment with a desktop. The shell synthesizes a hypertext page for display as the desktop in the graphical user interface. The hypertext page has an embedded software object which provides graphical icon-oriented and menu-driven user interface elements for activating operating system services in the displayed hypertext page. The shell also provides windowed hypertext pages for managing file system folders. The shell synthesizes the hypertext pages from templates which can be edited to incorporate a variety of multi-media enhancements with the user interface elements in the graphical user interface. Templates can be associated with specific folders in the file system to provide folder specific hypertext pages integrated with user interface elements for managing the folder.

17 Claims, 7 Drawing Sheets

OPERATING SYSTEM SHELL HAVING A WINDOWING GRAPHICAL USER INTERFACE WITH A DESKTOP DISPLAYED AS A HYPERTEXT MULTIMEDIA DOCUMENT

FIELD OF THE INVENTION

This invention relates to a user interface or shell of an operating system, and more particularly relates to the incorporation of rich and dynamic multimedia content into such an interface.

BACKGROUND AND SUMMARY OF THE INVENTION

It is now common for operating systems to have a shell which provides a graphical user interface (GUI). The shell is a piece of software (either a separate program or component part of the operating system) that provides direct communication between the user and the operating system. The graphical user interface typically provides a graphical icon-oriented and/or menu driven environment for the user to interact with the operating system.

The graphical user interface of many operating system shells is based on a desktop metaphor. More specifically, the graphical user interface is intended to create a graphical environment which simulates working at a desk. These graphical user interfaces typically employ a windowing environment with a desktop.

The windowing environment presents the user with specially delineated areas of the screen called windows, each of which is dedicated to a particular application program, file or document. Each window can act independently, as if it were a virtual display device under control of its particular application program. Windows can typically be resized, moved around the display, and stacked so as to overlay another. In some windowing environments, windows can be minimized to an icon or increased to a full-screen display. Usually, the windows have a top to bottom order in which they are displayed, with top windows at a particular location on the screen overlaying any other window at that same location. The top-most window has the "focus" and accepts the user's input. The user can switch other windows to the top by clicking with a mouse or other pointer device, or by inputting certain key combinations. This allows the user to work with multiple application programs, files and documents in a similar manner as physically working with multiple paper documents and items which can be arbitrarily stacked or arranged on an actual desk.

The desktop of the graphical user interface is a screen display containing icons representing programs, files and resources available to the user. As such, the desktop acts as a launching point for running application programs, opening documents or files, and initiating operating system services. In accordance with the desktop metaphor, the desktop simulates the top of an actual desk on which various work items are made available to the office worker. The desktop in some graphical user interfaces thus includes icons representing resources found on a real desk, such as a file cabinet, telephone, wastebasket, and scratchpad, which are used to access their computer equivalents. In typical graphical user interfaces, the desktop always remains as a full-screen background display relative to the windowing environment. In other words, the desktop cannot be moved or resized, and all visible windows of the windowing environment overlay the desktop as would paper documents and other items on top of an actual desk.

A drawback to many prior desktops is their limited capacity to present multi-media content enhancements. For example, the shell of the Microsoft Windows® 95 operating system provides a graphical user interface with a windowing environment and a desktop. As a default, this desktop includes a "my computer" icon, a "network neighborhood" icon, and a "recycle bin" icon against a solid color background, and also includes a task bar along a bottom edge of the screen with a "start" button for menu-driven interaction. It is possible to add additional icons onto this desktop to represent other application programs, documents, files, and resources. The start menu also can be customized to include additional items, such as for launching particular applications, and opening documents or files. Further, a graphic image can be selected as a background of the desktop (called "wallpaper") in place of the default solid color background.

Other aspects of the Windows® 95 shell also are limited in their capacity to present multi-media content enhancements. In particular, the shell provides windowed folder views accessed through the my computer and network neighborhood icons that represent the contents (i.e., files and sub-folders) of a directory or folder in the file system of the computer or a connected local area network (LAN). The folder views have four display modes: large icon, small icon, list and detail. In the icon modes, the folder view displays icons representing the files and sub-folders in a window against a white background. The icons used to represent the files and sub-folders in the folder view are dependent on the type or format of the file, e.g., documents having a Microsoft Word format are represented with an icon indicative of that application program. In the list and detail modes, the folder view displays a text listing of the files and sub-folders in its window also against a white background.

An add-on product for the Microsoft Windows® 95 operating system, called the Microsoft Windows® 95 Plus Pack, includes packaged enhancements called "themes" for the graphical user interface of the Windows® 95 operating system. Each theme includes a group of resources which alter the appearance and feel of the graphical user interface. These resources include substitute icons, mouse pointer graphics and animations, sounds, a wallpaper, and a screen saver. A particular theme can be selected and applied to the graphical user interface using a themes applet which the plus pack installs into the Windows® 95 control panel (an application program group which includes small application programs or applets that control various aspects of the operating system). Again however, the themes provide only limited multi-media content enhancements to the desktop. The applied theme can change the desktop's wallpaper, and the graphics of the my computer, network neighborhood and recycle bin icons.

In contrast to the limited capacity for multi-media enhancement on the desktop, multi-media content commonly appears in a windowed application program in the graphical user interfaces of Windows® 95 and like operating system shells. Application programs which present multimedia content include desktop publishing, video games, multi-media encyclopedias and like references, Internet browsers, and many others. Since the windowed application programs are separate and independent of the desktop, the multi-media content presented in the application program windows cannot effectively enhance the presentation on the desktop itself.

Further, multi-media content is made available in numerous formats. Still images are available in JPEG (Joint Photographic Experts Group), GIF, BMP (Windows® bitmap), and other file formats. Sounds are distributed in WAV (wave), MIDI and other file formats. Video is distributed in MPEG (Motion Picture Experts Group), AVI and other file formats. The hypertext markup language (HTML) format is widely used to distribute documents or pages including text, images, video and sound on the World-Wide Web of the Internet. Three dimensional environments are now being developed in virtual reality markup language (VRML) and other formats. These various multi-media formats provide a facility for expressing multi-media content, but do not of themselves provide a facility for providing desktop functionality with multi-media enhancement.

The present invention provides multi-media content enhancements to the desktop of an operating system's graphical user interface. In one system according to the invention, an operating system shell synthesizes the display for the desktop into a hypertext multimedia document format (the HTML format, for example). The synthesized document includes the graphical icon oriented and menu driven user interface elements of the desktop, and also can include multi-media enhancements, such as text, graphics, sounds, animations, video, hypertext links, etc. These enhancements can add informative or explanatory content to the desktop, or otherwise customize the appearance and/or behavior of the desktop. The shell also acts as a hypertext multimedia document viewing software to display the synthesized document as the desktop in a graphical user interface, preferably as a full-screen background display to a windowing environment.

According to one aspect of the invention, the shell synthesizes the hypertext multimedia document from a template which contains the multi-media enhancements or references to the enhancements. The shell includes a pre-processor which processes the template and produces the synthesized document which is to be displayed as the desktop. This pre-processor converts soft or variable parameters into data in the hypertext multimedia document's format which is output in the synthesized document for display with the multi-media enhancements. The templates also contain document data for output in the synthesized document to cause embedding of a software object or objects in the displayed view of the synthesized document. These software objects implement the functionality of the desktop's graphical icon-oriented and/or menu driven user interface elements which control operating system and/or file system services. When the synthesized document is then displayed as the desktop in the graphical user interface, the object(s) provide the user interface features and functionality (e.g., for launching application programs, opening documents and files, drag and drop functionality, etc.) of the desktop. By embedding the objects in the synthesized document, these user interface features are displayed in combination with the multi-media enhancements by the shell.

According to a further aspect of the invention, the shell also synthesizes hypertext multimedia documents for display as the folder views and other displays in the shell's graphical user interface. The hypertext multimedia documents for the various displays are synthesized from templates which are identified in a configuration or ".ini" file. When the user navigates to one of the displays, the shell looks up the appropriate template to use for the display. The shell then processes the template into a hypertext multimedia document with embedded objects to provide the user interface elements required for the display (e.g., the graphical icons and drag and drop functionality in a folder view). The synthesized document is then displayed by the shell. The shell is thus able to provide multi-media content enhancements to these additional shell displays.

Synthesizing the desktop and other displays from templates further allows the multi-media enhancements to be easily and flexibly added and changed. The templates are in the format of the hypertext multimedia documents, and additionally contain directives to replace soft parameters by the pre-processor. The enhancements provided by the templates can be altered by editing the templates using hypertext document editing software or even a text editor. Alternatively, a new template or complete set of templates can be swapped in by changing entries in the configuration file. Accordingly, the overall appearance and behavior of the shell can be immediately changed by substituting the set of templates identified in the configuration files.

In an embodiment of the invention illustrated herein, the synthesized documents for the various displays are displayed in a single designated area or frame in the graphical user interface, such as the full-screen background display area of the windowing environment. As the user navigates from one display (e.g., the desktop) to another (e.g., a folder view), the shell switches the hypertext document displayed in the designated area in a fashion similar to navigating a hyperlink between hypertext documents.

The shell in the illustrated embodiment further operates as viewer or browser of hypertext documents. In addition to the synthesized hypertext documents for shell displays, the shell also displays and navigates between other hypertext documents, such as those available from the Internet. The shell thus extends hyperlink navigation and the rich multi-media content of hypertext documents to the shell's graphical user interface.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

1. Computer Overview

Figure 1:
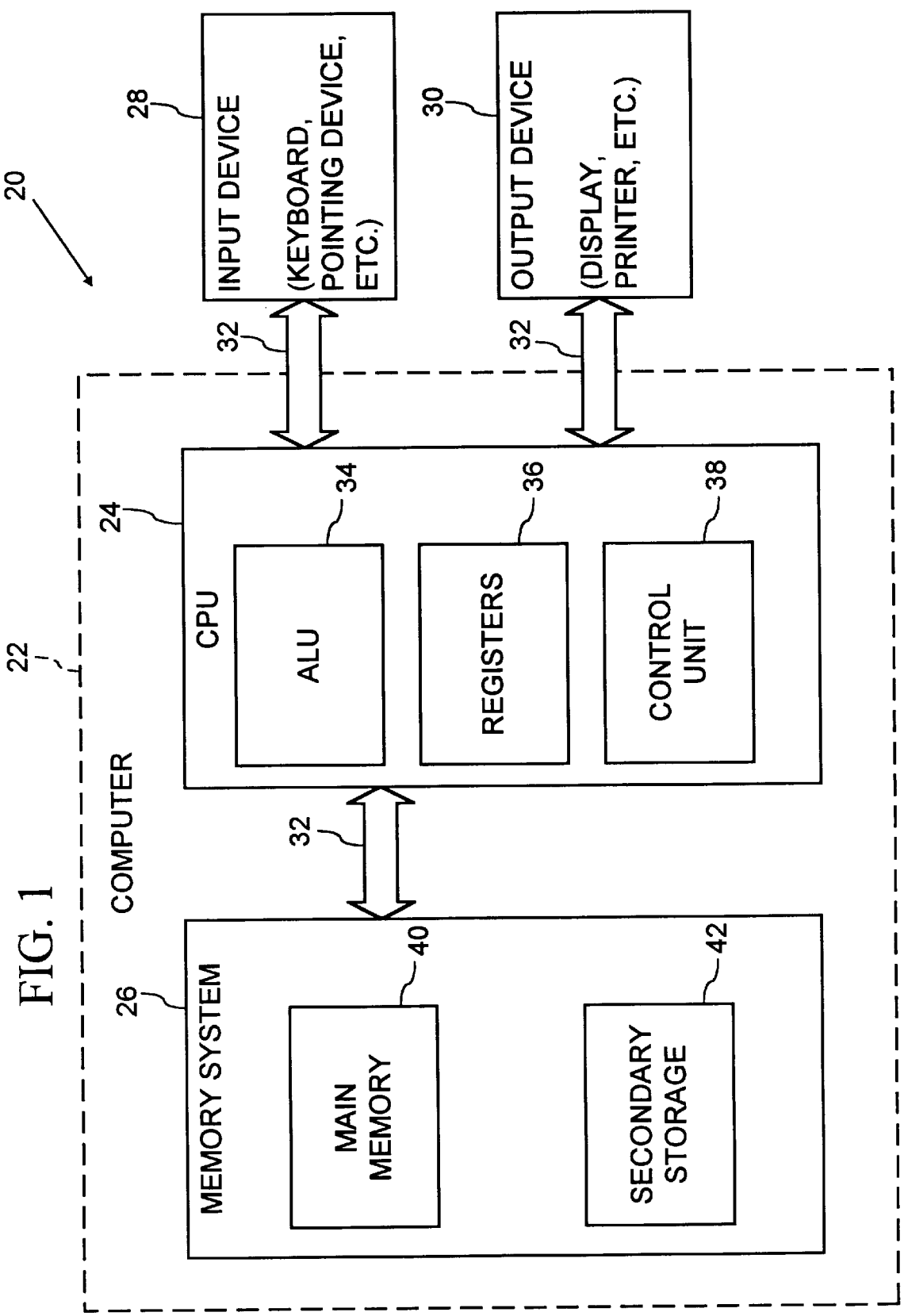
FIG. 1 is a block diagram of a computer system that may be used to implement a method and apparatus embodying the invention for incorporating multi-media enhancements to an operating system shell.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

2. Shell Overview

Figure 2:
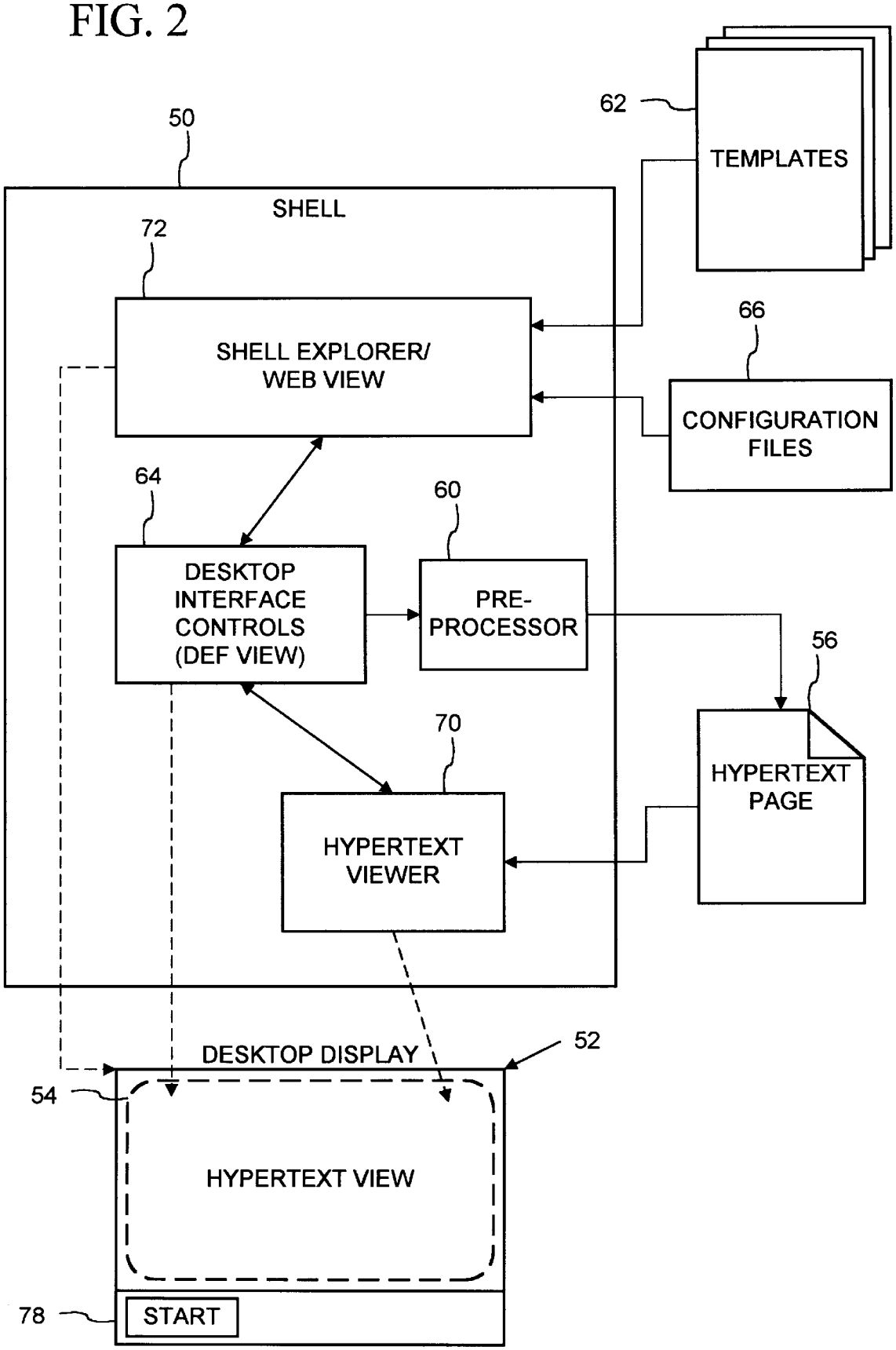
FIG. 2 is a data flow diagram showing the synthesis of a hypertext multimedia document by an operating system shell for a desktop display in a graphical user interface.

With reference to FIG. 2, a shell 50 for an operating system of the computer 20 (FIG. 1) provides a graphical user interface for a user of the computer to interact with the operating system. The graphical user interface includes a desktop display 52 presented on a video screen of the computer's output device 30 (FIG. 1). The desktop display 52 preferably is presented by the shell in a windowing environment as a full-screen background display. Specifically, any visible windows that are not minimized to an icon are displayed overlaying the desktop display 52 in the windowing environment.

In the illustrated shell 50, the shell presents a variety of views 54 (listed in table 1 below) for different aspects of the graphical user interface on the desktop display 52. These views 54 are similar to displays presented in the graphical user interface of the Microsoft Windows® 95 operating system, but additionally include multi-media enhancements incorporated in the views in accordance with the invention. More particularly, the views 54 include the desktop and desktop container displays of the Microsoft Windows® 95 operating system. The desktop container displays are sub-displays of the Microsoft Window® 95 desktop, that contain a group of related graphical icons for file management or for launching application program and operating system services (e.g., My Computer, Network Neighborhood, Control Panel, etc.).

For each of the views 54 presented on the desktop display 52, the shell 50 synthesizes the view as a hypertext page 56. The illustrated hypertext page 56 is in a hypertext markup language (HTML) format. The HTML format is a standard format for multi-media hypertext documents which is used on the Word-Wide Web portion of the Internet. (The Internet is a global network of cooperatively interconnected computer networks, consisting of millions of individual computers. A portion of the Internet referred to as the "World-Wide Web" consists of computers, also referred to as "sites," which make multi-media documents in HTML format generally available for downloading or retrieval by individuals having a computer with Internet access.) HTML format documents are ASCII encoded files which employ tags to designate text formatting, hyperlinks, and multi-media content to be incorporated from other resources (e.g., files) into the document. Further details of the HTML format of the illustrated hypertext page 56 are described in the *HTML Reference,* attached hereto as Appendix Q.

A hypertext document is a document that contains hyperlinks. Hyperlinks are references to other documents which are generally indicated in a displayed view of the document as a graphic, underlined text, or highlighted text, and which can be activated by user input to the viewing software to cause the viewing software to navigate to the referenced document. A multimedia document is a document which contains or incorporates multiple forms and/or formats of information content such as text, images, sounds, software objects, video, animations, etc.

The shell 50 obtains the hypertext page 56 from which a view in the graphical user interface is synthesized from processing a stored hypertext template, or alternatively directly from a stored hypertext page. In the former case, the shell 50 includes a pre-processor 60 which synthesizes the hypertext page 56 from one or more of a set of templates 62 and one or more desktop interface controls 64. The templates 62 are files which contain data in the HTML format which is to be incorporated into the hypertext page 56, and additionally include pre-processor directives. The directives are instructions to the pre-processor for converting soft parameters into html formatted data in the hypertext page 56. The templates for each of the views in the illustrated shell are shown in the following Table 1.

TABLE 1

Hypertext View Templates

| Friendly Name | File Name |
| --- | --- |
| Briefcase | brfcase.htm |
| Control Panel | control.htm |
| Default folder | folder.htm |
| Desktop | desktop.htm |
| Favorites folder | favorite.htm |
| File-system folder | directry.htm |
| My Computer | mycomp.htm |
| Network Neighborhood | nethood.htm |
| Printers | printer.htm |
| Recycle Bin | recycle.htm |
| Start Menu and subfolders | startmnu.htm |
| Workgroups | domain.htm |
| Vendor-specific workgroups | msdomain.htm |
| Vendor-specific networks | msnet.htm |
| Vendor-specific servers | msserver.htm |
| Servers | server.htm |
| Audio CD | audiocd.htm |
| Dial-Up Networking | dialupnt.htm |
| Entire Network | fullnet.htm |
| Fonts folder | fonts.htm |
| History | history.htm |
| My Documents | mydocs.htm |
| Network Workgroup | workgrp.htm |
| Program Files folder | progfile.htm |
| Root of data CD | datacd.htm |
| Root of floppy disk drive | floppy.htm |
| Root of hard disk | harddrv.htm |
| Windows folder | windows.htm |

In general, the templates listed in Table 1 are related one-to-one with folders and are used to synthesize a hypertext page for a display associated with the related folders. Some of the folders correspond to actual directories in a file system of the computer's memory system 26 (FIG. 1). For example, each of the "windows folder," "root of hard disk," and "my documents" folders correspond to actual file system directories. The displays associated with these folder generally represent (at least in part) the contents of the corresponding directory, and are called "folder views." Others of the folders (termed "virtual folders") do not correspond to any file system directory. Accordingly, the displays associated with these folders generally do not represent the contents of a file system directory. For example, the "my computer" folder is a virtual folder.

The templates listed in Table 1 are for producing displays associated with a set of standard folders in the Windows® operating system. In addition to these standard folder templates listed in table 1, the templates 62 also can include additional templates for non-standard folders (herein called "custom templates"), such as folders corresponding to file system directories created by a user or added by a software installation program. For example, an installation program of an application software product (such as a productivity software, computer game, or utility software) that creates a new folder in which to install the application software's files also can add a template associated with the folder to the set of templates 62. When the newly created folder is viewed in the graphical user interface, the shell 52 uses this added custom template to produce a folder view display representing the newly created folder's contents. These added custom templates can contain multimedia content enhancements specific to the new folder, such as graphic images, text, hyperlinks, or software objects relating to the application software product or its vendor.

The template (or alternatively stored hypertext page) to be used by the shell in synthesizing the hypertext page view in each display in the graphical user interface is identified in one or more configuration files 66. The configuration files 66 can include both local and global configuration files. More particularly, folders that are actual file system directories can contain a hidden local configuration file (named "desktop.ini" in the illustrated computer 20). (Hidden files are files having a flag or attribute which is set to indicate that the file normally is not displayed by a file management tool, e.g., the Windows Explorer in the Windows® 95 operating system.) This "desktop.ini" configuration files stores data identifying the template (e.g., by path and file name in the computer's file system) to be used in producing a folder view display of the folder. A listing of a representative desktop.ini file is shown in the following table 2.

TABLE 2

Representative Desktop.Ini File Listing.

[ExtShellFolderViews]
Default={FB7E5040-1F6D-11D0-89A9-00A0C9054129}
{FB7E5040-1F6D-11D0-89A9-00A0C9054129}={FB7E5040-1F6D-11D0-89A9-00A0C9054129
}
{00000001-0001-0002-0003-000000000001}={25336920-03F9-11CF-8FD0-00AA00686F13
}
{00000002-0001-0002-0003-000000000002}={00020900-0000-0000-C000-000000000046
}
{00000003-0001-0002-0003-000000000003}={00020810-0000-0000-C000-000000000046
}
[{00000001-0001-0002-0003-000000000001}]
PersistFile="pageone.html"
MenuName="friendly-name-for-view-1"
ToolTipText="Html View"
HelpText="This shows a HTML document"
[{00000002-0001-0002-0003-000000000002}]
PersistFile="word.doc"
MenuName="friendly-name-for-view-2"
ToolTipText="Word Document View"
HelpText="This shows a Word document"
[{00000003-0001-0002-0003-000000000003}]
PersistFile="Excel.xls"
MenuName="friendly-name-for-view-N"
ToolTipText="Excel Spreadsheet view"
HelpText="This shows an Excel spreadsheet"
[{FB7E5040-1F6D-11D0-89A9-00A0C9054129}]
IconArea__Image="c:\win95B\bubbles.bmp"
IconArea__Pos=1

The above representative desktop.ini file begins with a section having the heading "[ExtShellFolderViews]." This section lists globally unique identifiers ("GUIDs") associated with software objects that implement views of the folder in which the desktop. ini file is stored. A line beginning "default=" specifies a default view of the folder. The four lines below this specify alternative custom views of the folder in the format, <GUID>=<GUID>. The left GUID on each line identifies the software object that implements the view. If there is an entry with this left GUID in the system registry for the view object (i.e., the GUID is a CLSID registered in the system registry), then the line modifies some of the view's attributes. In such case, the right GUID is a CLSID that identifies the pre-processor 60 to be used for processing the template for that view, or alternatively identifies the viewer object (e.g., the HTML viewer 70 of FIG. 2 or other document object) which displays the hypertext page in the view (i.e., for use when the hypertext page itself is stored rather than a template from which the hypertext page is produced). If there is no entry with the left GUID in the system registry, then the line indicates a custom view and is unique only with the respective desktop.ini file.

More specifically, in the above representative desktop.ini file, the first or default line of the "[ExtShellFolderViews]"

section identifies an object that implements a default view for the folder. The second line overrides some attributes of one of the folder's views. A separate section at the bottom of the desktop.ini file has lines which change the "IconArea_Image" and the "IconArea_Pos" attributes of that view, specifically the background bitmap of the view and its position (e.g., whether centered or tiled).

The third, fourth and fifth lines of the "[ExtShellFolderViews]" section specify custom views for the folder. The left hand identifiers are not CLSIDs of views registered in the system registry, and are unique only within the desktop.ini file. The right hand GUIDs on these lines are CLSIDs of objects registered in the system registry. Specifically, the right hand GUIDs are CLSIDs of the HTML viewer 70, a Microsoft® Word document object, and a Microsoft® Excel document object, respectively. (Document objects are described below.) The desktop.ini file contains a section for each of the custom views which have the line "PersistFile= . . . " When one of these views is selected for display, the respective document object of the view is instantiated with the hypertext page, Word document, or Excel document, respectively, identified on the "PersistFile" line.

The template (or alternatively stored hypertext page) associated with a folder (whether an actual file system directory or virtual folder) also can be identified by entries in a global configuration file, which in the illustrated shell 52 is the system registry. In the Microsoft® Windows® operating system, the system registry is a database which stores configuration information for the operating system, including information to enumerate and track applications, device drivers, and operating system control parameters. For a detailed discussion of the registry, see Win32 Programmers Reference, Vol. 2, published by Microsoft Press, Redmond, Wash. (1993). Representative entries in the system registry for the illustrated shell 52 are listed in the following Table 3.

TABLE 3

Representative System Registry Entries for Folder Views

| Folder Type | Registry Entry |
| --- | --- |
| Virtual Folder | HKCR\CLSID\{guid of virtual folder}\shellex\ExtShellFolderViews\{guid of view} PersistFile="template.htm" |
| Directory | HKCR\Directory\shellex\ExtShellFolderViews\{guid of view} PersistFile="directry.htm" |
| Default Folder | HKCR\Folder\shellex\ExtShellFolderViews\{guid of view} PersistFile="folder.htm" |

Each of the representative registry entries in the above table include a GUID of a view which identifies either a pre-processor (where the view is synthesized from processing a template) or a document viewer (where the view is synthesized directly from a stored hypertext page or other document). If the GUID identifies a pre-processor (e.g., the pre-processor 60) then the registry also contains an entry to identify the document viewer (e.g., the hypertext viewer 70 of FIG. 2) for the hypertext page or other document produced from the pre-processor processing the template. This registry entry for the pre-processor has the form:

HKCR\CLSID\{guid of view}\FilterView="{guid of document viewer}"

These system registry entries that identify templates (or stored hypertext page or other document) to use in producing displays of the graphical user interface are created when the operating system shell 50 is first set up or installed. The registry entries can be edited manually or altered by software to substitute a different set of templates for the standard templates listed in Table 1 or to add to the standard templates.

The shell 50 determines the template (or stored hypertext page) to use in synthesizing the view of a particular folder from this information in the configuration files 66. If the folder is an actual file system directory, the shell 50 checks for a desktop.ini configuration file in the directory. If the folder contains a desktop.ini configuration file which identifies a template (or stored hypertext page or other document), the shell 50 uses that template. If not, the shell 50 checks in the system registry for a registry entry under the "HKCR\directory" key (as shown in the representative registry entry for a directory in Table 3 above) that is specific to the folder and identifies its associated template (or stored document). If such a folder specific registry entry is found, the shell 50 uses the template identified in that folder-specific entry. If not, the shell 50 checks the system registry for a default folder entry under the "HKCR\folder" key (as shown in the representative default folder registry entry in Table 3 above). If the default folder entry is found, the shell 50 uses the template or document (e.g., the "folder.htm" template listed in the above Table 1) identified in the default folder entry. This default folder registry entry can be edited to change the default folder template (or document) used when no folder specific template is found.

If, on the other hand, the folder is a virtual folder, the shell 50 checks for an entry under the HKCR\CLSID key that lists a class identifier of the virtual folder (as shown in the representative registry entry for a virtual folder in Table 3 above). If such a virtual folder entry is found that identifies a template (or document), the shell 50 uses the identified template to produce the virtual folder's hypertext page 56. Otherwise, the shell 50 looks to the default folder entry under the "HKCR\folder" key (as shown in Table 3 above), and uses the default folder template identified in that entry.

The particular folder for which the shell 50 synthesizes the current view 54 in the desktop display 52 is controlled by user action. At start-up, the shell synthesizes the desktop view from the "desktop.htm" template for the desktop folder. From this view, the user can navigate to other views (e.g., folder views of the my computer, network neighborhood, or file system directory folders) by activating icons or hyperlinks on the desktop display, or selecting commands from menus available on the current page. For example, the user can navigate to the my computer view by mouse clicking on the My Computer icon on the desktop view. Whereupon the shell 50 synthesizes the My Computer view from the "mycomp.htm" template, and displays the My Computer view.

Figure 3:
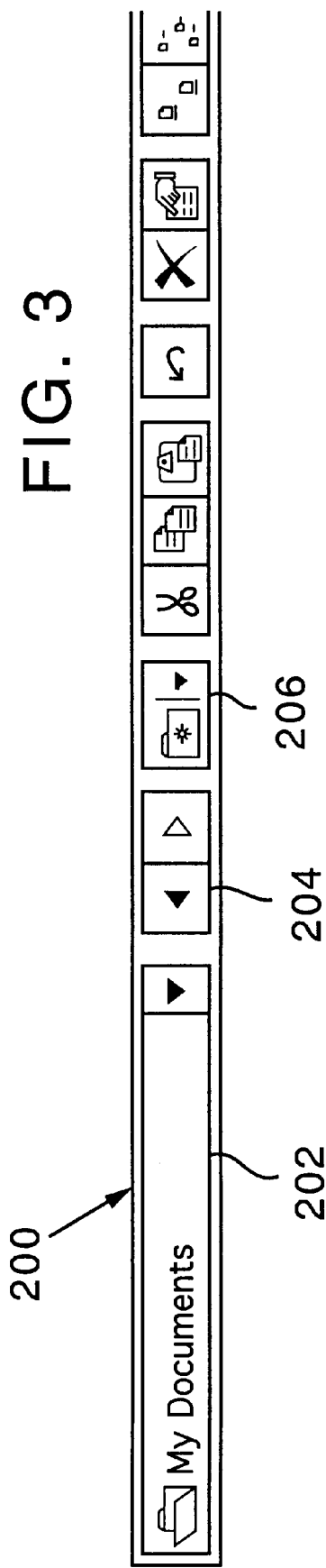
FIG. 3 is a view of a navigation bar incorporated by the shell of FIG. 2 in the folder display of FIG. 7.

With reference to FIG. 3, a navigation toolbar 200 is presented by the shell 51 on folder view displays, such as the My Computer view. The user activates controls on the navigation bar to move between folder view displays, or back to the desktop display. The navigation toolbar 200 includes a drop down list control 202 in which the user can select to navigate to a desired folder. The destination folder can be selected from a list or typed into the control 202. The navigation toolbar 200 also includes back and forward history controls 204 which the user can activate to move backwards and forwards through a history of previously navigated folders. The navigation toolbar 200 further includes a favorites menu button 206 which accesses a user specified list of folders. Each folder view display also may include other controls for navigating to another folder view display. The My Computer view, for example, contains icons which the user can activate to navigate to the floppy and hard disk drive folder views.

When synthesizing the hypertext page 56 for the current view, the pre-processor 60 parses the corresponding template(s) for the view (as shown in the Table 1 above or identified by the "desktop.ini" configuration file), and performs any pre-processor directives encountered in the templates. In the illustrated templates 62, the pre-processor directives follow a syntax rule of being bracketed between the characters "<%" and "%>" to distinguish from HTML formatted data. The directives primarily specify soft parameters which the pre-processor converts into HTML formatted data for output into the hypertext page 56. For example, the soft parameters can include the name of the folder whose contents are to be shown in a folder view, the name of the My Computer or other view (the user can rename these icons and corresponding views in the illustrated shell). Further details of the pre-processor directives are described below.

The pre-processor 60 utilized by the shell 50 for processing the templates 62 into hypertext pages 56 for use as displays in the graphical user inteface is identified by entries in the system registry. A class identifier ("CLSID") associated with the pre-processor is stored in the system registry under an "ExtShellFolderViews" key, and given a named value of "PersistFile=desktop.htm." The pre-processor 60 is implemented as an OLEICOM object (as described below). The pre-processor also has an associated entry under its CLSID in the system registry. This entry has a subkey "FilterView" under which is stored a CLSID associated with the document viewer (e.g., the HTML viewer 70 in the illustrated shell 50). This allows a third party software vendor to substitute a custom pre-processor into the shell 50 in place of the illustrated pre-processor 60.

The desktop interface controls 64 are software components (referred to as "objects") that implement the functionality of a particular aspect of the shell's graphical user interface. For example, the desktop interface control for the desktop view provides the graphical icons (e.g., My Computer, Network Neighborhood, and Recycle Bin icons), menus, and functionality (e.g., drag and drop, icon and menu activation, and other operations) of that view. The control which is incorporated into the hypertext page 56 for the folder views provides the large icon, small icon, list and detail mode graphical icon oriented user interface and functionality of the folder views in the Microsoft Windows® 95 operating system. These controls include interfaces which allow the controls to interoperate with the shell to provide the view on the desktop display 52, and with the operating system to provide file management and to launch application programs and operating system services. The desktop interface controls 64 are embedded in the hypertext page 56 using HTML tags as described in further detail below.

The illustrated shell 50 also includes a hypertext viewer 70 and a shell explorer 72 which provide the desktop display 52 on the video screen of the computer's output device 30 (FIG. 1). The hypertext viewer 70 is a software component in the shell 50 which operates to parse the HTML formatted data in the hypertext page 56, and produce the view 54 of the hypertext page for display in the desktop display 52. In effect, the hypertext viewer 70 contains the HTML parsing and display code equivalent to an Internet browser. The illustrated hypertext viewer supports parsing and display of the same HTML format which is supported in the Microsoft® Internet Explorer.

The shell explorer 72 is another software component of the shell which manages graphical user interface elements of the desktop display other than the view. More specifically, the shell explorer 72 provides a frame of the desktop display having a display area in which the hypertext viewer 70 draws the view 54 of the hypertext page 56. The frame includes user interface elements (e.g., the task bar 78 with start button and menu) that continue to be displayed on the desktop display when the hypertext view changes. In effect, the shell explorer 72 acts as a host or container of the hypertext page view 54 displayed by the hypertext viewer 70. The shell explorer 72 and hypertext viewer 70 cooperate to embed the view 54 provided by the hypertext viewer 70 in the desktop display's frame provided by the shell explorer 72.

3. Object Overview

With reference to FIG. 3, the shell explorer 72 and the hypertext viewer 70 are implemented as objects which conform to Microsoft Corporation's Component Object Model (COM), and support various ActiveX (also known as Object Linking and Embedding ("OLE")) interfaces. COM, ActiveX and OLE are object-oriented technologies which provide integration and interoperability between separate software components. For a detailed discussion of OLE see *Inside OLE, Second Edition* by Kraig Brockschmidt, Microsoft Press, Redmond, Wash. 1995. A brief overview of objects in OLE and associated terminology is provided below before discussing the details of the illustrated embodiment.

Figure 5:
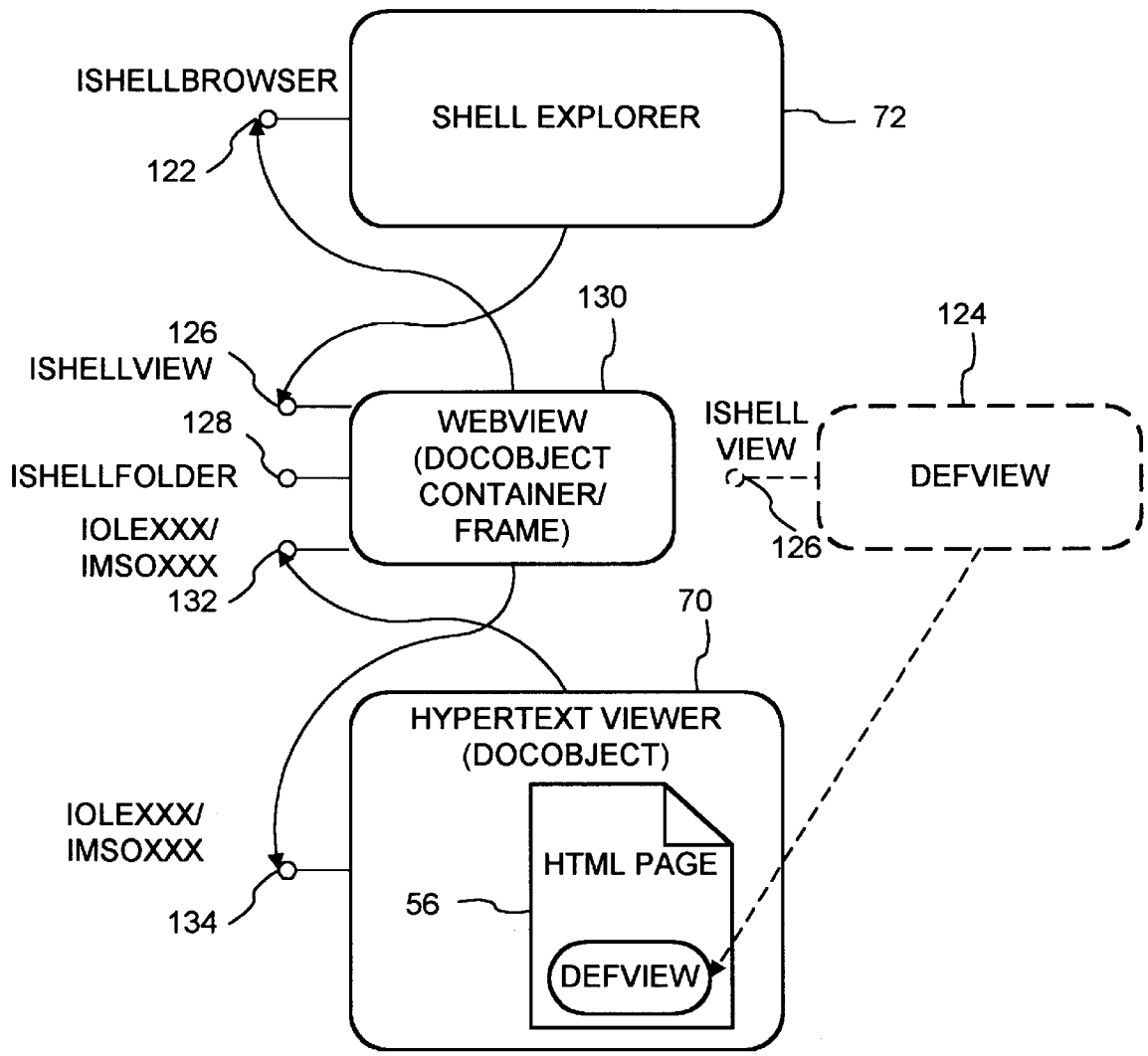
FIG. 5 is an object framework in the shell of FIG. 2 which supports presenting a hypertext document incorporating graphical user interface functionality as a desktop display.
Figure 6:
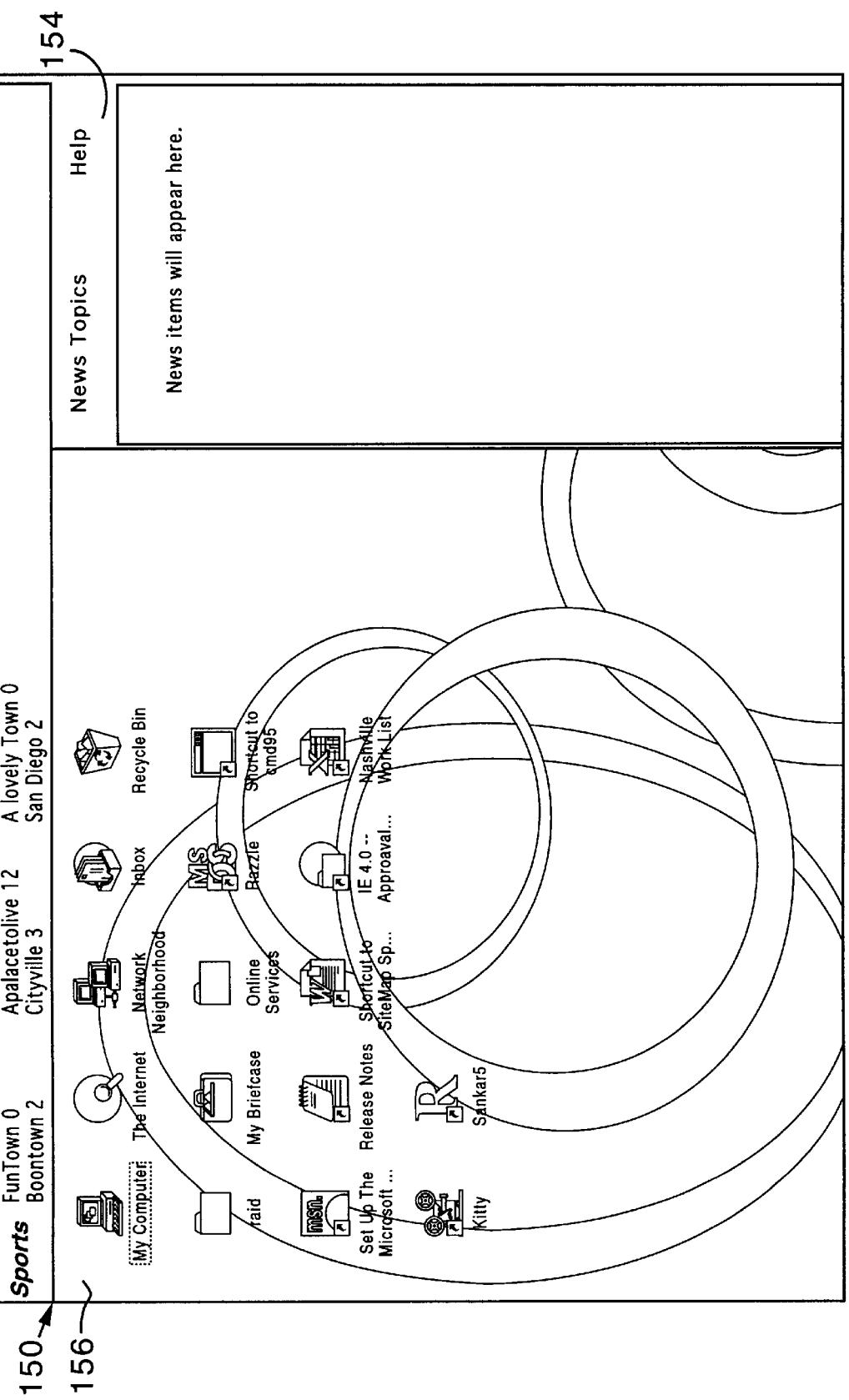
FIG. 6 is a view of a desktop display presented by the shell of FIG. 2.
Figure 7:
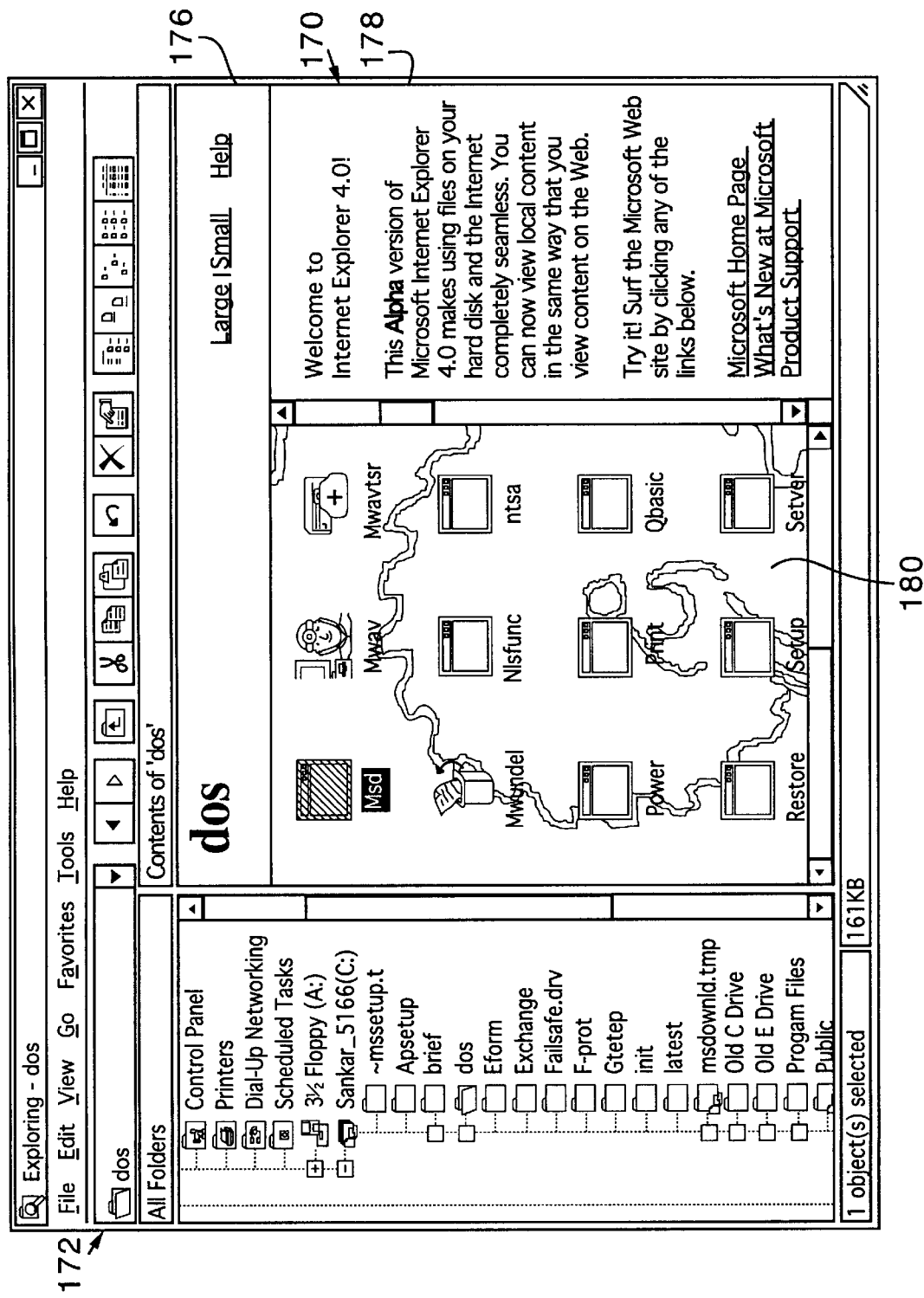
FIG. 7 is a view of a folder display presented by the shell of FIG. 2.

Using these object-oriented technologies, the illustrated shell 50 (FIG. 2) works with the hypertext page 56 by encapsulating the hypertext page into an associated object (i.e., the hypertext viewer 70), and integrating with the object using pre-defined interfaces (hereafter referred to as the document object interfaces, and also referred to as the IOLEXXX/IMSOXXX interfaces, which are described in more detail in the *OLE Document Objects Specifications*, attached hereto as Appendix R). The hypertext viewer document object includes code to work with the hypertext page 56 (i.e., data in the HTML format), including code to display a view of the hypertext page in the desktop display 52. The document object interfaces of the hypertext viewer allow integration with the shell explorer 72, which operates as a host or container of document objects (i.e., by providing the desktop display 52 having a display area in which a hosted document object—the hypertext viewer 70—can display its view of the hypertext page 56). As a document object host, the shell explorer 72, can host any variety of document (e.g., documents associated with the Microsoft Word, Microsoft Excel, and other application programs from Microsoft or other software developers) which is encapsulated by an object that supports the document object integration interfaces. Implementing the hypertext viewer as a document object also allows the desktop and folder views of the synthesized hypertext page 45 to be embedded in other document object containers, such as a file manager, Internet browser or other application program which is implemented as a document object container. An example in which a view of the hypertext page 56 produced by the hypertext viewer 70 is hosted in the desktop display 150 of the shell explorer 72 is shown in FIG. 5 and described in more detail below. A further example in which a view of the hypertext page 56 produced by the hypertext viewer 70 is hosted in a window of an application is shown in FIG. 6 and described in more detail below.

An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

Microsoft Corporations's COM specification defines binary standards for objects and their interfaces which facilitate the integration of software components. According to the COM specification, a typical object 80 is represented in the computer system 20 (FIG. 1) by an instance data structure 82, a virtual function table 84, and member functions 86–88. The instance data structure 82 contains a pointer 90 to the virtual function table 84 and data 92 (also referred to as data members, or properties of the object). A pointer is a data value that holds the address of an item in memory. The virtual function table 84 contains entries 96–98 for the member functions 86–88. Each of the entries 96–98 contains a reference to the code 86–88 that implements the corresponding member function.

The pointer 90, the virtual function table 84, and the member functions 86–88 implement an interface of the object 80. Client programs interact with the object 80 by obtaining a pointer (referred to as an interface pointer) to the pointer 90 of the virtual function table 84. OLE includes a type definition of an interface pointer which allows client programs to call member functions on the interface by name through the interface pointer and provides type checking on the function's arguments, as expressed in the following code (in the C++programming language):

pInterface->MemberFunction( . . . )

By convention, the interfaces of an object are illustrated graphically as a plug-in jack as shown for the document object in FIG. 3. Also, Interfaces conventionally are given names beginning with a capital "I." Objects can include multiple interfaces which are implemented with one or more virtual function tables. The member function of an interface is denoted as "IInterfaceName::FunctionName." The object 80 conforming to the COM specification exhibits data encapsulation by exposing its interfaces (semantic groupings of its member functions) to client programs. The client programs interact with the object 80 by calling the member functions 86–88 on a particular interface of the object, but do not directly manipulate the object's data. The object 80 also exhibits polymorphism and inheritance in that the object 80 can provide interfaces in common with a base class and other similar objects, so that client programs can interact with each of the objects in the same manner by calling member functions of the interface that the objects have in common.

4. Document Object and Server Overview

Referring still to FIG. 3, the virtual function table 84 and member functions 86–88 of the object 80 are provided by a server application program 100 which is stored in the computer system 20 (Fig. 1) as an executable program file (with a ".exe" file name extension) or as a dynamic link library file (with a ".dll" file name extension). Dynamic link library files are loaded, dynamically linked, and executed by the Windows® operating system in a same process with a client application program. Executable program files are loaded by the operating system as a separately executing process. In accordance with OLE, the server application 100 includes code for the virtual function table 84 (FIG. 3) and member functions 86–88 (FIG. 3) of the classes that it supports, and also includes a class factory 102 that generates the instance data structure 82 (FIG. 3) for an object of the class.

A server application can be written by a programmer to support a particular class of object that contains any desired data. More specifically, a programmer can write server applications which provide objects that contain the data of a particular variety of computer document (e.g., document 56 of FIG. 2), such as a text document, spreadsheet, drawing, etc., or that contain data for part of a computer document, such as a range of spreadsheet cells, a paragraph of a text document, etc. These objects which contain document data (and additionally support the document object interfaces described above) are referred to herein as document objects. (Further details of document object are described in the *OLE Document Objects Specifications,* attached hereto as Appendix R.) For example, software application programs such as Microsoft® Word can be written as a server application in which the application program's documents are represented as OLE objects. The illustrated shell 50 (FIG. 2) includes a server application which represents the hypertext page 56 as a document object (i.e., the hypertext viewer 70). This allows the shell explorer 72 (FIG. 2) and other document object containers to interact with the hypertext page 56 through the document object interfaces.

For a client program (e.g., a document object host or container) to interact with the object 80 provided by the server application 100, the server application must first create the object (i.e., instantiate an object of a class supported by the server application) and the client program must gain an interface pointer to the object 80. In OLE, the client program realizes these events using services provided by OLE and a set of standard object interfaces defined by COM based on class and interface identifiers assigned to the object's class and interfaces. More specifically, the services are available to client programs as application programming interface (API) functions provided in the COM library, which is part of a component of the Windows® operating system in a file named "OLE32.DLL." In OLE, classes of objects are uniquely associated with class identifiers ("CLSIDs"). Class identifiers are 128-bit globally unique identifiers ("GUID") that the programmer creates with an OLE service named "CoCreateGUID" and assigns to the respective classes. The interfaces of an object are associated with interface identifiers ("IIDs").

In particular, the COM library provides an API function, "CoCreateInstance," that the client program can call to request creation of an object to encapsulate a particular documents data using a CLSID associated with the data. The CoCreateInstance API function creates the object and returns a pointer of the requested interface to the client program.

Once the client program has obtained a first interface pointer to the object 80, the client program obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client program obtains to an interface of the object 80 can be used to call the QueryInterface function.

In a typical situation, however, the only information that the client program has to reference a particular document is a textual name, such as a file name or an Internet URL. In the case of a file name, the COM library provides API functions (e.g., "GetClassFile," "ReadClassStg" and "ReadClassStm") for obtaining a CLSID associated with the file. Client programs also can utilize a system provided object known as a moniker to resolve a name that references a document into an interface pointer on an instantiated object that encapsulates the document's data. These well known mechanisms are described in more detail in *Inside OLE, Second Edition,* supra.

5. Shell Objects and Interfaces

In addition to the document object interfaces, the illustrated shell 50 (FIG. 2) also utilizes an object-oriented framework of the Windows Explorer application, folder view windows, and "File Open" dialog in the Microsoft Windows® 95 operating system. This framework defines three interfaces, a shell browser ("IShellBrowser") interface 122, a shell view ("IShellView") interface 126 and a shell folder ("IShellFolder") interface 128, which are described in further detail in the Appendix S attached hereto. The shell browser interface 122 is supported on an object which acts as a container for views of a namespace, such as the folders in a file system. This container object provides a top level window having a frame in which to embed the namespace view. Examples of such a container object include the object which provides the top level or outer window in the Windows Explorer application, and also the object which provides the top level window for folder views in the shell of the Windows® 95 operating system. The namespace is a collection of symbols (e.g., names) associated with items managed through the container object, and rules for resolving a given name into the item it designates. In the case of an operating system shell, the namespace may include file names, directory names, storage devices, registry keys, printers, network resources, etc.

The shell browser interface 122 allows the namespace view contained in such a container window to insert menu items with those of the container window into a composite menu, install the composite menu into the container's window, and also remove the container's menu items from the composite menu. The shell browser interface 122 also allows the namespace view to set and display status text relevant to the view in the container's window. The view also can enable and disable the container's modeless dialog boxes, and translate accelerator keystrokes intended for the container through functions of the container object exposed by the shell browser interface 122.

The shell view interface 126 is supported on a view object which provides a namespace view for display in the container object's window. In the Windows® 95 operating system, for example, includes a default view ("DefView") object 124 which provides a view of the desktop in the Windows® 95 shell's graphical user interface which graphically represents the desktop, including the graphical icon-oriented and menu user interface elements of the desktop view (i.e., the full screen background display with the My Computer, Network Neighborhood, and Recycle Bin icons, drag and drop functionality, and pop-up menus of the desktop). Other view objects in the Windows® 95 operating system provide the large icon, small icon, list and details views representing a folder's contents which are displayed in the folder view windows and the Windows Explorer application's window. The container object for these windows communicate with the view objects through the shell view interface 126. The communication involves the translation of window messages, the state of the container object's window (e.g., activated or deactivated), the merging of menus, and tool bar items.

The shell folder interface 128 is provided in this framework for implementing on objects that manage or extend the namespace. The shell folder interface 128 provides functions to display or operate on the contents of the namespace. For example, an object supporting the shell folder interface can add additional groups of symbols to the namespace, such as uniform resource locators ("URLs") of World-Wide Web pages.

In the illustrated shell 50, the shell browser interface 122 is implemented on a shell explorer object 120 which provides the desktop display 52 (FIG. 2) and acts as a container for the hypertext view 54. As described above, the desktop display 52 operates as the desktop of a windowing environment of a graphical user interface provided by the shell 50. More particularly, the shell explorer object 120 in the illustrated shell 50 is the Shell Explorer from the Microsoft Windows® 95 operating system which manages the Windows® 95 operating system's overall graphical user interface and windowing environment, and acts as a container for the desktop and folder views provided by the default view object 124.

The illustrated shell 50 (FIG. 2) extends the framework of the Windows® 95 operating system shell to also support document object hosting by the shell explorer 120, so as to allow displaying the view 54 of the synthesized hypertext page 56 in the desktop display 52. This is achieved in the illustrated shell 50 by a web view object 130 which supports the document object container interfaces 132 in addition to the shell view interface 126 and the shell folder interface 128. By supporting these interfaces, the web view object 130 effectively operates as a bi-directional proxy object. The web view object 130 can act as both a shel view object that can by hosted by the shell explorer 120, and as a document object container that can host the hypertext viewer 70 or other document objects. Since the web view object 130 supports the shell view and shell folder interfaces, it can take the place of the default view object 124 in the framework of the Windows® 95 operating system shell.

6. Desktop Interface Controls

Figure 4:
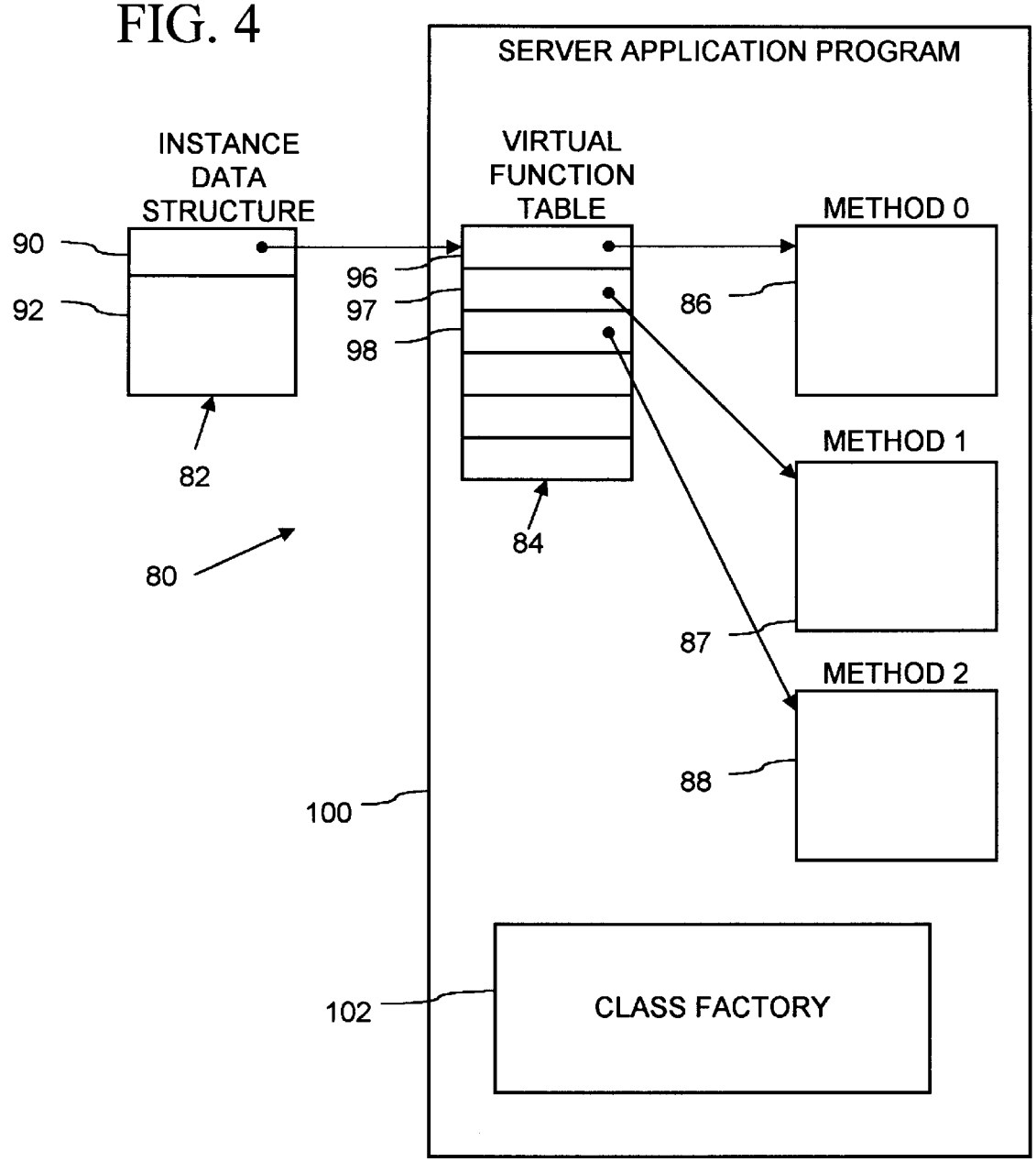
FIG. 4 is a block diagram of typical data structures for an object in the computer system of FIG. 1.

With reference still to FIG. 4, the default view object 124 (FIG. 2) from the Windows® 95 shell framework is modified in the illustrated shell 50 for embedding in the hypertext page 56 as one of the desktop interface controls 64. More specifically, the desktop interface controls are implemented as ActiveX controls. An ActiveX control is an object which conforms to the COM specification, and may support additional OLE interfaces such as those for drag and drop operations and other OLE functions. In particular, the desktop interface controls 64 (including the default view object 124) support OLE interfaces that allow the object to be embedded in a document object. In other words, interfaces which allow a document object such as the hypertext viewer 70 to act as a container or host of the embedded desktop interface controls 64. Further details of ActiveX controls are described in in the *OLE Control and Control Container Guidelines,* attached hereto as Appendix T.

In the illustrated shell 50 (FIG. 2), the desktop interface controls 60 are embedded in the hypertext page 56 using an HTML object embedding tag, which has the following format:

```
<OBJECT classid=codebase=data=height=width=>
```

The classid parameter of this tag (if present) specifies a class identifier of the control. The hypertext viewer uses the class identifier to create the control, such as by calling the CoCreateInstance API function to cause the control's server application to be loaded and the server application's class factory to instantiate the control. The codebase parameter (if present) specifies a URL of a file containing the control (such as on the Internet). If the control is not installed on the computer 20, the hypertext viewer can retrieve this file using the URL from the Internet and then install the file on the computer before instant control using its class identifier. The data tag (if present) specifies persistent data for the control as either a text string or via a URL of a file containing the control's persistent data. Further details of the HTML object embedding tag are described in the *HTML Reference,* attached hereto as Appendix Q.

The templates 62 which are processed into the hypertext page 56 include the HTML object embedding tags which specify the desktop interface controls 64 to embed in the displayed hypertext view 54. Since the HTML object embedding tags already are in the HTML format, the pre-processor 60 outputs the tags along with other HTML format data from the templates 62 directly into the hypertext page 56 without conversion.

When displaying the hypertext view 54 of the hypertext page 56, the hypertext viewer 70 parses the HTML object embedding tags along with the other HTML format data in the hypertext documents. On encountering the HTML object embedding tags for the desktop interface controls 64 during the parsing, the hypertext viewer 70 instantiates the desktop controls 64 using the class identifiers specified in the tags. If the server applications for the controls 64 are not installed on the computer 20 (FIG. 1), the hypertext viewer 70 can download the server application using the URLs specified as the codebase attribute of the tags (if any). The hypertext viewer 70 then displays the instantiated desktop interface controls 64 together with the other content of the hypertext page in the hypertext view 54. In addition to the desktop interface controls 64 which implement the desktop and folder view functionality of the shell, other ActiveX controls also can be incorporated in the same manner to provide further multi-media enhancements in the form of executable software content.

7. Template Pre-Processor Directives

As described above with reference to FIG. 2, the templates 62 contain directives which control processing of the templates by the pre-processor 60 into the hypertext page 56. The directives can cause the pre-processor to perform several different operations, which include converting parameters with variable values into HTML format data for output into the hypertext page 56, processing additional templates into sub-pages of the hypertext page 56, and also specifying a particular pre-processor to use for the pre-processing. As described above, the directives each begin with the characters "<%" and end with the characters "%>" to distinguish from the HTML data in the templates 62.

Each of the illustrated templates 62 begin with the following initial directive, which the pre-processor 60 uses to detect whether the template is a valid template and to detect its beginning.

```
<%WinShell=CreateObject("WinShellHTMLPreProc")%>
```

As this initial directive indicates the beginning of the template, the pre-processor 60 processes only directives that appear after this in directive in the template and ignores any directive appearing on any lines before the initial directive in the template. If this initial directive is not encountered in the template, the template is considered invalid.

The later directives in each template specify parameters whose value the pre-processor converts into an HTML format text string for output into the hypertext page 56. In the illustrated templates 62, these directives have the format of the text string "WinShell." followed by a tag which designates the particular parameter to be converted, as shown in the following example directives:

```
<%WinShell.Title%>
<%WinShell.TemplateDirPath%>
<%WinShell.ProcessFile("dsk_1.htm")%>
<%WinShell.IfProxy("http://iptdweb.microsoft.com/activedesktop/desktop/tickhost.htm","%WINDIR%\web\ticker.htm")%>
```

For some of these directives, the conversion of parameters into HTML format text strings by the pre-processor 60 is as simple as outputting a current value of the parameter in the form of a text string. For example, the illustrated pre-processor 60 responds to the "<%WinShell.Title%>" and the "<%WinShell.TemplateDirPath%>" directives by simply outputting a text string of the designated parameter's current value. The tag "Title" refers to a parameter whose value is a name of the view which is produced from the template, e.g., "Desktop" for the desktop view, or the name of a particular folder for a folder view. The tag "TemplateDirPath" refers to a directory path name of the directory in the file system where the templates 62 are stored.

Other directives require move complex processing by the pre-processor 60 for conversion to an HTML format text string. The "<%WinShell.ProcessFile("dsk_1.htm")%>" directive for example, causes the pre-processor 60 to also process another of the templates 62 (e.g., the "dsk_1.htm" file specified in the tag) into an HTML format file, then output the name of that file in the form of an HTML text string as the value of the parameter. As another example, the directive with the tag "IfProxy" instructs the pre-processor to output a first text string if the shell 50 is running on a computer which uses a proxy server on a local area network for connecting to the Internet, and to output a second text string otherwise.

8. Desktop Hypertext Page View Example

FIG. 5 illustrates an example hypertext desktop view 150 produced and displayed in the desktop display 52 (FIG. 2) on a video screen of the computer 20 (FIG. 1) according to the illustrated embodiment of the invention. The example hypertext desktop view 150 is produced in the illustrated shell 50 by processing a set of templates using the pre-processor 60 (FIG. 2), including a "Desktop.htm" template, and a "Dsk_1.htm" template which are listed in the attached Appendices A and B, respectively. As a result of this processing, the pre-processor 60 outputs a hypertext page consisting of a "Sfv2395.tmp" and a "Sfv15143.htm" HTML format files which are listed in the attached Appendices G and H, respectively. This synthesized hypertext page additionally incorporates data from the HTML format files, "Infopane.htm," "news.htm," "ticker.htm," and "tickhost.htm" which are listed in the attached Appendices C through F, respectively. The synthesized hypertext page is parsed by the hypertext viewer 70 to generate the example hypertext desktop view 150.

The example hypertext desktop view 150 integrates a variety of multi-media elements with the graphical icon oriented and menu driven user interface elements of the desktop. The example hypertext desktop view 150 has separate HTML frames (i.e., areas on an HTML page) for a ticker 152, a news pane 154, and desktop icons frame 156. The ticker 152 presents scrolling HTML format information retrieved from the Internet, such as stock quotes and sports scores. The news pane 154 also presents HTML format information retrieved from the web, such as images and text relating to news events. The desktop icons frame 156 includes the desktop interface control 64 (FIG. 2) which provides the graphical icon oriented and menu driven user interface elements of the desktop, including the "My Computer," "Network Neighborhood," "Recycle Bin" icons and other user installed icons as well as the drag and drop and other operations of the desktop user interface as in the Windows® 95 operating system shell.

9. Folder Hypertext Page View Example

FIG. 6 illustrates an example folder view 170 produced and displayed within an Explorer window 172 on a video screen of the computer 20 (FIG. 1) according to the illustrated embodiment of the invention. The example folder view 170 is produced in the illustrated shell 50 by processing a set of templates using the pre-processor 60 (FIG. 2), including a "Directory.htm" template, a "Dir_1.htm" template, a "Dir_2.htm" template, and a "Dir_3.htm" template which are listed in the attached Appendices I through L, respectively. As a result of this processing, the pre-processor 60 outputs HTML format files, "Sfv6190.tmp," "Sfv67916.htm," Sfv47917.htm," and "Sfv47945.htm." The "Sfv6190.tmp" HTML file is a synthesized hypertext page which incorporates HTML format data from the other files. The synthesized hypertext page is parsed by the hypertext viewer 70 to generate the example folder view 150.

The example hypertext folder view 170 is shown hosted in an Explorer application window 172 in FIG. 6, rather than the desktop display 52 (FIG. 2) as was the desktop view 150 (FIG. 5). The Explorer application in this example is implemented using the object-oriented framework shown in FIG. 4. However, in this example, the shell explorer object 72 provides an application window similar to that of the Windows Explorer application in the Windows® 95 operating system. Using the framework, the Explorer application hosts the hypertext viewer 70 as a document object which allows the view 54 of the hypertext page 56 to be displayed in Explorer application's window 172.

The example hypertext folder view 170 integrates a variety of multi-media elements with the graphical icon oriented and menu driven user interface elements of Windows® 95 folder views (i.e., the large icon, small icon, list and detail folder views). The example hypertext folder view 150 represents the contents of the folder, "c:\dos," on the computer 20 (FIG. 1), and has separate HTML frames for a title banner 176, a supplemental hypertext frame 178, and a folder icons frame 180. The title banner 176 presents a title (specifically a name of the folder represented by the folder view) with formatting (e.g., font face, size, etc.) as specified by the HTML data in the hypertext page, and hypertext links which the user can activate to navigate to further hypertext views (i.e., alternative hypertext views of the folder, and a hypertext help page with instructions on operating the Explorer application). The supplemental hypertext frame 178 includes text and hypertext links to supplement the folder's contents. The user can navigate these hypertext links to hypertext pages on the Internet. The folder icons frame 180 includes an embedded desktop interface control 64 which provides the graphical icon oriented and menu driven user interface elements of the folder view, including icons representing the files and sub-folders contained in the folder (i.e., the "c:\dos" folder) represented in the folder view as well as the icon drag and drop, scrolling and other user interface operations as are available in the folder views of the Windows® 95 operating system.

The example hypertext desktop view 150 and example hypertext folder view 170 show a few of the multi-media elements that can be incorporated with graphical user interface elements into the hypertext view 54 for display in the desktop display 52 or an Explorer application window. In the illustrated shell 50, the hypertext viewer 70 contains code to parse and display hypertext pages in the HTML format, including any of the HTML tags supported by the Microsoft® Internet Explorer 3.0 browser software. The hypertext views in the illustrated shell therefore can incorporate any of the multi-media elements implemented using these HTML tags, including HTML frames, tables, fonts, hypertext links, embedded images, embedded sounds, embedded objects, and others. Other multi-media elements also can be incorporated in the hypertext views by modifying the hypertext parsing and display code of the hypertext viewer 70 to also support appropriate tags for such elements.

In an alternative embodiment of the invention, the shell 50 can produce displays in the graphical user interface directly from stored hypertext pages. More particularly, in place of a stored set of templates 62 (FIG. 2), the hypertext page for each display is stored and identified in the configuration files 66. This elimates pre-processing of a stored template to produce the hypertext page whenever a display is generated, and thus speeds generation of displays in the graphical user interface. The shell 50 therefore omits the pre-processor 60 in this alternative embodiment.

In some alternative embodiments of the invention, multimedia document formats other than HTML can be used for the pages 56 (FIG. 2). Further, the format of the pages 56 can be other than a hypertext format, or in other words need not allow for hyperlinks to be incorporated into the pages 56. For example, a multimedia document format which does not include hyperlinks, such as the document formats used in the Microsoft® Word and Microsoft® PowerPoint application software, can be used.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer having a display device, a system for displaying a user interface to an operating system as a hypertext multimedia document on the display device, comprising:

a graphical user interface for providing a windowing environment supporting a plurality of windows displayed on the display device according to a front to back order wherein a window towards the front in the order overlaps any windows farther back in the order which are displayed in a same area of the display device; and a desktop in the windowing environment of the graphical user interface for providing a view of a hypertext multimedia document as a full-screen graphical background display over which the windows are displayed.

2. The system of claim 1 comprising:

a plurality of icons in the hypertext multimedia document and operative to launch application programs on user activation.

3. The system of claim 1 comprising:

a plurality of icons in the hypertext multimedia document and operative to activate file system services.

4. The system of claim 1 comprising:

a representation in the hypertext multimedia document of the contents of a folder in a file system of the computer.

5. An operating system shell comprising:

a hypertext multimedia document template;

a preprocessor for processing the template into a hypertext multimedia document having an embedded control object for providing at least part of an operating system's graphical user interface; and a viewer for displaying a view of the hypertext document in the graphical user interface wherein the embedded control object is manipulable by a user to activate a service of the operating system.

6. The operating system shell of claim 5 comprising:

a view container object for hosting the viewer and providing a desktop display in which the view is embedded as a full-screen graphical background display of a windowing environment.

7. The operating system shell of claim 5 comprising:

a view container object for hosting the viewer and providing an application window in which the view is embedded.

8. A template for use in a system to synthesize a hypertext multimedia document to provide an operating system user interface, the system having a preprocessor, an embeddable user interface control object, and a hypertext multimedia document viewer, the template comprising:

hypertext data for incorporating multi-media information into the hypertext multimedia document;

at least one preprocessor directive for converting parameters into hypertext data; and an object insertion tag for embedding the user interface control object into the hypertext multimedia document, wherein the embedded control object is manipulable by a user to activate a service of the operating system, whereby the preprocessor processes the template into a hypertext multimedia document which provides an operating system user interface when displayed by the viewer.

9. A method of providing a graphical user interface to an operating system of a computer having a video screen, comprising:

providing an operating system user interface control manipulable by a user to activate a service of the operating system;

providing a hypertext page having hypertext data for incorporating multi-media enhancements, and an object insertion tag indicative of said control for embedding said control;

generating a view of the hypertext page incorporating said multi-media enhancements and with said control embedded therein; and displaying the view on the video screen.

10. The method of claim 9 comprising:

displaying the view in a desktop display of a windowing environment on the video screen, the desktop display being a full-screen graphical background display of the windowing environment.

11. The method of claim 9 comprising:

displaying the view in a window of a windowing environment on the video screen.

12. The method of claim 9 comprising:

providing a template having the hypertext data, the object insertion tag, and a pre-processor directive specifying a parameter; and processing the template to synthesize the hypertext page from the template, the processing including converting the parameter into hypertext data.

13. The method of claim 12 wherein the view of the hypertext page represents a folder of a file system managed by the operating system, the method comprising:

storing a configuration file in the folder specifying the template; and when a user navigates to the folder, identifying the template to use for synthesizing the hypertext page from the configuration file.

14. A file system navigation method comprising:

providing a plurality of templates associated with folders in a file system, the templates having an object insertion tag for embedding a folder user interface control;

when a folder is opened by a user, performing the steps of:

processing the template associated with the opened folder to produce a hypertext page having the object insertion tag; and displaying a view of the hypertext page with the folder user interface control embedded therein, whereby the user manipulates the folder user interface control to activate file system services relating to the folder.

15. The method of claim 14 comprising:

storing configuration files in at least some of the folders, each configuration file containing data identifying the template associated with the respective folder in which the configuration file is stored;

if the opened folder stores one of the configuration files, determining the template associated with the opened folder from the configuration file stored in the opened folder; and otherwise, determining a default template is associated with the opened folder.

16. A hypertext page, comprising:

hypertext data; and an object insertion tag for embedding a user interface control object, said object providing graphical icon-oriented and/or menu driven user interface elements for controlling operating system and/or file system services when the hypertext page is viewed.

17. A desktop provided by an operating system shell on a computer as a full-screen graphical background display of a hypertext multimedia document in a windowing enviroment of a graphical user interface, comprising:

a plurality of graphical icon-oriented and menu-driven user interface elements provided by a control object, the user interface elements being manipulable by a user of the computer to initiate operating system services; and a view of a hypertext multimedia document incorporating multi-media enhancements and having the control object embedded therein for integrating the multi-media enhancements with the user interface elements, the view constituting at least part of the full screen graphical background display of the desktop in the windowing environment.

* * * * *